United States Patent Office 3,364,658
Patented Jan. 23, 1968

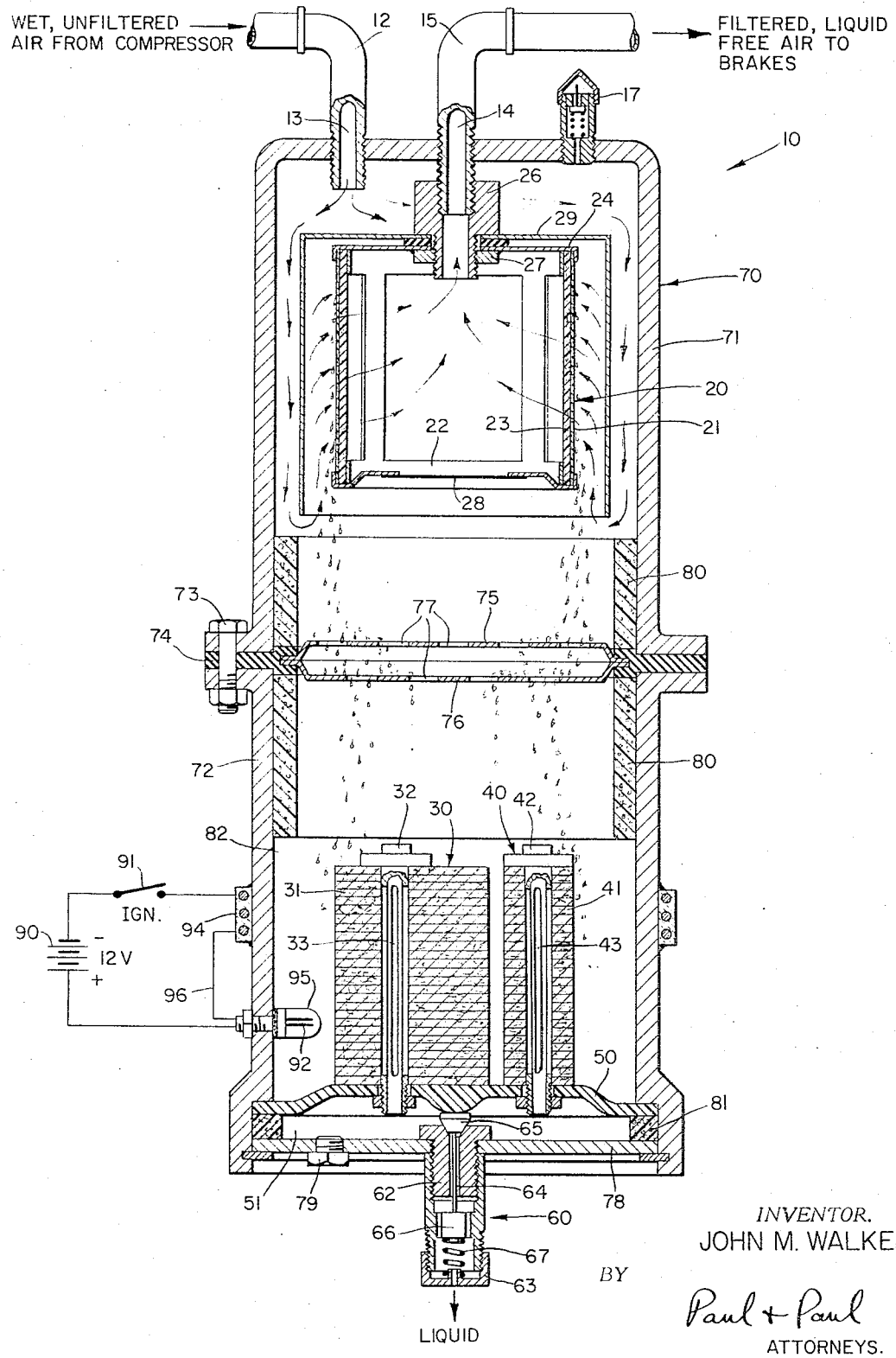

3,364,658
MULTI-PHASE SEPARATION UNIT
John M. Walker, Langhorne, Pa., assignor to R. M. Hollingshead Corporation, Camden, N.J., a corporation of New Jersey
Filed Sept. 1, 1966, Ser. No. 576,683
17 Claims. (Cl. 55—171)

ABSTRACT OF THE DISCLOSURE

A rugged three-phase separation device is disclosed which is especially suited for removing oil and water from the compressed air supplied to the air-brakes of an over-the-road motor truck or tractor-trailer, and discharging it to the road without loss of air pressure. The compressed air is passed to the brakes through the separation device which has therein a non-brittle material impervious to oil and water. The oil is passed into a compartment in the separation device through a non-brittle material which is impervious to water and air. The water is passed into the same compartment through a non-brittle material which is impervious to oil and air. Except for the passages into the compartment for passing thereinto the oil and the water, the compartment is isolated from the remainder of the separation device by a barrier impervious to air, water and oil. The oil and water which accumulates in the compartment is discharged automatically therefrom through pressure responsive valve means.

---

This invention relates to devices for removing, from a gaseous-phase fluid, one or more liquid-phase fluids entrained in and carried by the gaseous-phase fluid. Where more than one liquid-phase fluids are entrained in the gaseous-phase fluid, and where such liquid-phase fluids are immiscible relative to each other, the device of the present invention functions not only to separate the gaseous-phase fluid from the liquid-phase fluids but also to separate the two or more liquid-phase fluids from each other. In a typical case, the gaseous-phase fluid may be air and two liquid-phase immiscible fluids entrained therein may be water and oil.

A particular use or application for the device of the present invention is in the air-brake system of a tractor-trailer or motor truck, or other transport vehicle for highway or off-the-highway use, but the use of the device is not limited thereto. For example, the device could be used with pneumatic tools and machinery.

A principal purpose of the present invention is then to provide a multi-phase separation device which retains its functional and structural integrity under vibration and shock conditions, such, for example, as may be encountered in the tractor-trailer, or motor truck, or other over-the-road or off-the-highway vehicle, or other pneumatic machine, device or tool.

Another purpose is to provide a multi-phase separation device which will function for its intended purpose at below freezing as well as at other ambient temperatures normally encountered during all seasons of the year.

A further purpose is to provide a multi-phase separation device which will resume phase separation after exposure to shock, vibration and freezing.

Another purpose is to provide a multi-phase separation device having the foregoing features in which the phase separation elements are disposable and replaceable.

Another purpose is to provide a multi-phase separation device which includes a fail-safe feature to assure provision of sufficient air to the air system of a motor vehicle or other machine, device or tool in the event the air-separation element becomes so clogged with foreign matter as to block the flow of sufficient air therethrough.

The invention will be clear from the following description of one form of tri-phase separation device which is illustrated in the single figure of drawing and which embodies the present invention.

While the separation device of the present invention may be used for other purposes, it will be convenient to assume that the device shown in the drawing is connected in the air brake system of a motor truck or other vehicle.

In the drawing, the tri-phase separation device is identified comprehensively by the reference numeral 10. Wet unfiltered air, as from the compressor unit of the motor vehicle and having, for example, a pressure of 100 p.s.i., is delivered through air line 12 and inlet 13 into the interior of the casing 70 of the separation device 10. Clean dry filtered air is delivered from the interior of the casing 70 through the outlet 14 and into air line 15, from which it may be carried ultimately to the air brakes of the motor vehicle or to any other pneumatic operated device in the vehicle.

The tri-phase separation device may be connected at any functional location in the air system. In a typical case, an air brake system of a motor vehicle may include two condensation or reserve tanks connected in series. If desired, the tri-phase separation device 10 may be connected between the two reserve tanks.

The compressed air forced through air line 12 and injected through inlet 13 into the interior of the separation device will ordinarily contain water in liquid phase derived from the water vapor in the air prior to its compression. Such water vapor condenses into liquid-phase water as the hot compressed air from the compressor gradually cools as it moves through the line 12 and into the separation device. If necessary, a special cool-down section can be installed ahead of the tri-phase separator in air line 12 to increase the amount and rate of condensation.

The compressed air in line 12 may also contain oil in liquid phase. Such oil is ordinarily derived from the compressor itself, as when the piston rings are worn. It not infrequently happens that some of the oil entrained in the compressed air in air line 12 is concentrated, in which event slugs of oil are injected from inlet 13 into the interior of the separation unit 10.

The function of the separation device 10 is to separate the liquid-phase water and oil from the gaseous-phase air. The separation device 10 includes an air separation unit 20, a water separation unit 30, and an oil separation unit 40. The air separation unit 20 is permeable to air but impervious to both water and oil in liquid phase. The water separation unit 30 is permeable to water but impervious to air and also to oil in liquid phase. The oil separation unit 40 is permeable to oil but impervious to air and to water in liquid phase. Thus, by employing a separation device having therein both a water separation unit 30 and an oil separation unit 40, both water and oil may be removed from the casing 10 of the separation device without loss of air pressure in the air-brake system.

The air separation unit 20 is mounted in the upper portion of the casing 70 of the separation device 10. The water separation unit 30 and the oil separation unit 40 are both located in the lower portion of the casing 70.

In the particular form shown in the drawing, the air separation unit 20 includes, as the element which is permeable to air but impervious to liquid-phase water and oil, a hollow cylindrical filter paper element 21 treated to be water and oil repellent. This hollow cylindrical filter paper element 21 is thin in thickness, as for example, .002" thick, and consequently does not have sufficient strength and rigidity to support itself. Accordingly, support means are provided internally of the paper element 21 which, in the illustrated form, is a hollow cylindrical metal can 22 having a slotted side wall covered over with an annular coarsely porous plastic film or sheeting 23. The plastic film 23 may have a thickness of 1/16" and may preferably be granular bonded polyethylene. The function of the plastic film 23 is to support the filter paper 21 against radial pressure at the locations of the relatively large slots or openings in the side wall of the can 22. The function of the metal can 22 is to support the coarsely porous plastic film 23. The top 24 of the metal can is closed except for a central aperture. The bottom of the can 22 is also closed, normally at least, but includes a circular blowout disc 28 which provides a fail-safe function as will be described later.

The air separation unit 20 may be supported by any suitable means within the upper portion of the casing 70 in such position as to be in the path of the air as it moves from the inlet 13 to the outlet 14. In the drawing, a hanger block 26 is shown supported from the lower end of the externally threaded outlet connection 14, and the can 22 is shown supported in depending position from the hanger block 26, being secured thereto as by a nut 27.

To protect the thin filter paper 21 from being damaged by slugs of oil which may be propelled with considerable force through the inlet connection 13, a protector or shield is provided which, in the illustrated form is shown as an open bottom cylindrical can 29 surrounding the air separation unit 20. The shield can 29, which is shown as supported by the hanger block 26, is sufficiently larger in diameter than the air separation unit 20 to provide adequate space for the air to rise upwardly through the annular space between the side walls of the shield 29 and the air separation unit 20. It is to be understood, however, that the shield may take other suitable forms. For example, it need not completely surround the air separation unit 20. It may merely be interposed between the inlet 13 and the unit 20.

While other materials may be used, the filter paper 21 was treated with a solution of a product known as Scotch Bond FC-805, a product of Minnesota Mining and Manufacturing Company. The filter paper presently preferred is Eaton-Dikeman #1058, and the treatment presently preferred is a 6% solution of Scotch Bond FC-805. I have found that this paper so treated is pervious to air but impervious to liquid-phase water and oil. The air pressure drop or average pressure differential across the treated paper 21 is only 1/4 pound. The air pressure differential across the coarsely porous polyethylene support 23 is much less.

The liquid-phase water and oil which is entrained in the air injected through inlet 13 into the interior of the casing 70 is unable to pass through the treated filter paper 21 and, accordingly, the liquid-phase water and oil drops downward in the casing 70, as indicated by the droplets in the drawing. As previously indicated, separation unit 10 includes a water separating unit 30 and an oil separating unit 40. These are shown mounted in side-by-side relation in the lower portion of the casing 70.

The water separation unit 30 includes a hydrophillic material, preferably a multi-layer stack of water wetted paper 31, preferably Eaton-Dikeman paper #752, compressed and held together by bolt 32. This paper 31 is readily wetted by water, and when wetted and compressed will pass water but will not pass either air or liquid-phase oil. The multi-layer stack of paper 31 is shown supported by bolt 32 on a circular disc diaphragm 50, which may preferably be neoprene, and which extends across the bottom portion of the interior of the casing 70 just above the bottom plate 78 of the casing. The diaphragm 50 is impervious to air, water and oil, thus forming a chamber 51 between the diaphragm 50 and the bottom plate 78. The shank 33 of bolt 32, including the threaded end portion, is externally slotted or fluted, so that water which passes through the wetted paper element 31 may run down the flutes of the bolt and pass by the diaphragm 50 into the chamber 51. In lieu of the slotted or fluted bolt any continuous pathway could be used.

The oil separating unit 40 includes an oil-wetted hydrophobic material 41 coarse enough to pass oil but having a structure such that the surface tension of the oil across the pores of the material 41 will withstand the pressure applied thereto without passing either liquid-phase water or air. The hydrophobic oil-permeable material 41 may preferably be leather, as for example, vegetable tanned sheepskin, but may be any other material whose surface chemistry is preferential to oil wetting and whose pores are not larger than needed to pass oil in the presence of water without passing either liquid-phase water or air. Other examples of suitable material for this purpose are Teflon, polyethylene, and chamois skin. Element 41 may preferably be a multi-layer stack of washers compressed and held together by the bolt 42 which also supports the element 41 on the impervious neoprene diaphragm 50. The shank 43 of the bolt 42, including the threaded end portion, is fluted or slotted externally so that oil passing through the element 41 may run down the flutes and into the chamber 51 below the diaphragm 50.

The casing 70 may take any suitable form. In the drawing, casing 70 is illustrated as having an upper half 71 and a lower half 72 bolted together as by bolts 73. A heat insulating sealing gasket 74, preferably nylon, is provided at the junction of the two halves of the casing. By making the casing 70 of two halves, the various component parts, such as the air separation unit 20 and shield 29, may readily and conveniently be mounted in the upper half 71, and the water and oil separating units 30 and 40, and the diaphragm 50 may conveniently be mounted in the lower half 72, before the two halves are connected together.

To prevent the compressed air, which is injected into the casing through inlet 13, from sweeping down and agitating the water which is provided or which collects in the lower portion of the casing, a pair of apertured baffle plates 75 and 76 may be supported by the lower casing 72 at its upper edge. The slots or holes 77 in the baffle plates may be staggered as shown to increase the effectiveness of the baffles as an air barrier while allowing water and the oil to drop from the upper to the lower half of the casing.

The bottom plate 78 of casing 70 is provided with a liquid discharge valve, identified comprehensively by the reference numeral 60. The discharge valve 60 may take any suitable form but is illustrated in the drawing as comprising a tubular metal member 61 secured as by welding to the under surface of plate 78. The upper portion of the tubular member 61 is internally threaded for receiving a T-shaped valve body 62, preferably nylon, and the lower portion is externally threaded for receiving an apertured cap 63 having a discharge opening in the center thereof. The valve body 62 has a frusto-conical valve seat in its upper surface and an axial bore extends downwardly therefrom. The diameter of the bore is slightly larger than the diameter of the depending stem 64 of the valve closure element 65, forming around the stem 64 an annular passage through which liquids may pass in a restrictive manner when the closure element 65 is lifted off its seat. At the lower end of stem 64 is a cylindrical nylon push button 66 which is urged upwardly against the end of the stem 64 by a compression spring 67 which seats around an apertured boss which projects upwardly from the center of the cap 63. The diameter of the push button 66 is smaller than the internal diameter of the tubular member 61, forming an annular passage for the liquids. The upper surface of the head of the closure element 65 normally abuts against the under surface of the neoprene diaphragm 50 which may be thickened at its center portion, as illustrated.

The interior wall of the casing 70, at the mid portion, is preferably provided with a foam lining 80 which may preferably be neoprene and which serves as a protection in the event the water in the casing should freeze. Similarly, the peripheral portion of the chamber 51 may preferably be provided with a neoprene foam lining 81 for a similar purpose. The neoprene foam linings 80 and 81 function to absorb the stresses which would otherwise be imposed on the casing wall on other components should the water freeze when the vehicle is not in operation.

To protect against freezing of the water in the casing when the motor vehicle is in operation, a heater system is provided. While the heat required could be obtained from the exhaust or other system, it is preferable to use an electrical heater which is adapted to be connected to and to receive energy from the battery or generator of the motor vehicle when the ignition switch 91 is closed. A thermostat switch 92, preferably mounted on the interior wall of the lower housing 72 in a waterproofed casing 95, controls the heater system when the ignition switch 91 is closed. Leads are carried through the wall of the lower casing 72, one of the leads 96 going to an electrical resistance heater 94 which tightly embraces the outer wall of the lower housing 72. This heater may preferably be a Clayborne electric strip heater of 40 watts rating. The thermostat 92 may preferably be a Stevens thermostat, set to close at 40° F., plus or minus 5°.

The operation of the tri-phase separation device 10 will now be described. It will be assumed that the air separation element 21 has been treated as described. It will also be assumed that the oil separation element 41 has priorly been thoroughly oil wetted. Before the device is connected to the lines 12 and 15, the casing 70 is inverted, plug 79 in the bottom plate 78 is removed, and the chamber 51 is filled with water. The plug 79 is then replaced, and casing 70 returned to its normal upright position. Water is then introduced into the lower half casing 72 and kept there for a period long enough to thoroughly wet the water separating element 31. This may be done by pouring water into the inlet opening 13 in sufficient quantity to submerge elements 31 and 41. After the elements are completely wetted, the casing may be inverted to discharge the excess water. The device is now ready to be connected into the air line, and the connections to inlet 13 and outlet 14 may now be made.

The weights of the water-wetted and oil-wetted units 30 and 40 are, of course, on the upper surface of the diaphragm 50, and this weight assists in forcing the diaphragm 50 downwardly, seating the closure element 65 against the force of spring 67, and preventing leakage of water from the chamber 51.

When the device 10 is connected into the air brake system of the truck, and the compressor is operating, compressed air at about 100 p.s.i. is injected into the interior of the casing 70 through the inlet 13. Provided in the top of the casing 10 is an air pressure relief valve 17. This valve 17 is normally closed. It is opened, as by manually depressing the valve stem, to allow air to escape, after the device has been in operation and prior to taking the casing apart to replace filter elements or to do other maintenance work.

It will be seen from the foregoing that in normal operation the pressure inside the casing 70 is, for example, of the order of 100 p.s.i., and this pressure, when added to the weight of the water inside the casing, exerts a downward force on diaphragm 50 and serves to keep the closure element 65 ordinarily seated in the valve body 62.

The wet unfiltered air, which is injected through the inlet 13, and which may at times contain concentrated slugs of oil, is deflected by the shield can 29, and the air passes downward and then upward through the open end of the shield can 29, through the treated filter paper 21, through the coarsely-porous polyethylene support 23, through the open slots of the support can 22, and out through the outlet valve 14 into the air line 15, as indicated by the flow arrows shown in the drawing.

As previously indicated, the filter paper 21 is treated to be both water and oil repellent and, accordingly, neither the liquid-phase water or the liquid-phase oil passes through the filter paper 21. The water and oil drop downwardly, as indicated by the droplets in the drawing, onto the upper baffle plate 75 and through the staggered openings 77 in baffle plates 75 and 76 into the water accumulated therebelow.

The hydrophillic element 31 of the water separator 30 passes water slowly from the main chamber 82 of the lower housing 72 into the slots or flutes of the bolt 32, and this water runs downwardly into the chamber 51. Similarly, any oil which may have been in the wet unfiltered air introduced through inlet 13, makes its way slowly through the oil-wetted element 41 into the flutes or slots of the bolt 42 and runs down into the chamber 51. Thus, as the tri-phase separation device 10 carries out its intended functions, the amount of liquid in the chamber 51 increases, and this causes the upward pressure on the under surface of the diaphragm 50 to increase. When this upward pressure increases to a value which is only slightly less than the downward pressure imposed on the upper surface of the diaphragm 50 by the compressed air and the weight of the accumulated water and oil, the compression spring 67 is able to raise the diaphragm 50, thus lifting the closure element 65 off its seat and allowing water and/or oil to drop through the restrictive annular passage which surrounds the stem 64 and out through the opening in the cap 63. Discharge of water and oil continues until the pressure differential across the diaphragm 50 is again increased to a value which is greater than the spring 67 can overcome. Thus, by the separation device disclosed, both water and oil are removed from the casing of the separation device without loss of air pressure in the air-brake system.

Where the tri-phase separation device 10 is used in the air brake system of a tractor trailer or other motor vehicle, or in other installations where the water in the separation unit may be subjected to below-freezing temperatures, freezing of the water may be prevented by an electrical heater system. One such system is shown in the drawing. As there shown, a thermostat switch 92 is mounted internally on the inner wall of the lower casing 72 and protected from the water by a water-tight heat-permeable covering 95. Switch 92 is set to close when the temperature drops below say 40° F. (plus or minus 5°), and if, when the thermostat switch 92 closes, the ignition switch 91 of the motor vehicle is closed, electrical current from the battery or generator 90 of the motor vehicle will flow through the electrical resistance heater 94 and the lower casing 72 will be sufficiently heated to prevent freezing of the water contained therein.

It is contemplated that the heater 94 will not be energized when the motor vehicle is parked and that the heater will only be energized by the battery and/or generator of the motor vehicle when the ignition switch is closed. Accordingly, provision is made in separation unit 10 for protecting the casing 70 and its contents in the event the water in the casing 70 freezes during periods when the ignition switch is not closed. If the water in the lower chamber 51 should freeze and expand, the annular ring of neoprene foam 81 will compress, thereby reducing the stress on the diaphragm 50, on the bottom plate 78 and on the wall of the lower housing 72. Similarly, if the water in the main chamber of the unit 10 should freeze, the expansion of the water as it freezes will compress the neoprene foam 80, thereby reducing the stress on the walls of the lower and upper housings 72 and 71, and on the contents thereof.

To accommodate for the possibility that filter paper 21 of the air-separation unit 20 may become so clogged with foreign matter as to block the flow of sufficient air into the outlet line 15 to operate the brakes or other pneumatic operated device, and to insure the supply of sufficient air pressure to the air system of the vehicle even though it be unfiltered and wet, a safety release, which may preferably be a blowout disc, such as disc 28, is provided in the bottom of the slotted can 22. This disc 28, which may, for example, be made of dead soft aluminum and have a thickness of the order of 0.00035 inch, is designed to blow out when the pressure differential exceeds five pounds, thereby providing a direct passage from inlet 13 to outlet 14. Alternatively, the safety release could, for example, be in the form of a flat molded rubber tubing used as a non-return valve arrangement.

The clogging of the air-separation filter 21 would, however, ordinarily be prevented by normal maintenance and replacement of the filter unit 20. To replace the unit 20, the release valve 17 would be operated to reduce the air-pressure in the casing, then the lower half 72 of the casing would be separated from the upper half 71, and the unit 20 removed and replaced. At the same time, the components in the lower casing would ordinarily be inspected, serviced, and replacements made, as required.

While a preferred form and use of this invention has been described in some detail, it will be obvious to one skilled in the art that various modifications may be made, for the same or for other applications and uses, without departing from the invention as hereinafter claimed. Also, while the device has been described as particularly suited for separating water and oil from air, other liquid-phase fluids may be separated from air or from other gaseous-phase fluids without departing from the broad concept of the present invention which contemplates a multi-phase separation device which will retain or resume its phase separation function despite shock, vibration and exposure to freezing conditions and which incorporates a safety release feature to assure supply of the gaseous fluid in the event the separation device should become clogged or blocked.

What is claimed is:

1. A multi-phase separation device for separating from a high pressure gaseous-phase fluid, without loss of pressure, first and second liquid-phase fluids entrained in said gaseous-phase fluid and immiscible with each other, said separation device comprising:
   (a) a casing having an inlet for receiving compressed gaseous-phase fluid having entrained therein at least first and second immiscible liquid-phase fluids,
   (b) said casing having a first outlet for discharging therethrough said compressed gaseous-phase fluid,
   (c) said casing having a second outlet for discharging therethrough said first and second liquid-phase fluids without loss of pressure within said casing;
   (d) first separating means interposed between said inlet and said first outlet, said first separating means being permeable to said gaseous-phase fluid but impervious to both said first and second liquid-phase fluids;
   (e) a barrier impervious to said gaseous-phase fluid and to both said first and second liquid phase fluids interposed between said inlet and said second outlet and forming a chamber therebetween, said barrier containing first and second discharge members;
   (f) second separating means interposed between said inlet and said barrier and connected to said first discharge member, said second separating means being permeable to said first liquid-phase fluid but impervious to said second liquid-phase fluid and to said gaseous-phase fluid;
   (g) third separating means interposed between said inlet and said barrier and connected to said second discharge member, said third separating means being permeable to said second liquid-phase fluid but impervious to said first liquid-phase fluid and to said gaseous-phase fluid,
   (h) said discharge members connected through said barrier for passing liquid-phase fluids from said second and third separating means, gaseous-phase fluid being excluded from passing through said barrier into said chamber.

2. A device as claimed in claim 1 characterized in that said first separating means is adapted to separate air from water and oil and includes a paper filter treated to be water and oil repellent, and means for supporting said paper filter in the upper portion of said casing.

3. A device as claimed in claim 2 further characterized in that said second separating means are adapted to separate water from oil and includes a non-brittle water-wetted filter material of substantial thickness and having pores of such small diameter that the surface tension of the water in the pores is capable of withstanding without rupturing the pressure applied thereagainst, further characterized in that said third separating means are adapted to separate oil from water and includes a non-brittle oil-wetted filter material whose surface chemistry is preferential to oil wetting and having pores sufficiently small that the surface tension of the oil is able to withstand without rupturing the pressure applied thereagainst, and in that said barrier is a non-brittle diaphragm disposed across the lower portion of said casing, said second separating means and said third separating means each being mounted on said diaphragm.

4. A device as claimed in claim 3 further characterized in that said water-wetted filter material of said second separating means is paper, and in that said oil-wetted filter material of said third separating means is leather.

5. A device as claimed in claim 4 further characterized in that said filter materials of said second and third separating means comprise multi-layer stacked material held together by compression means which also support said stacks on said diaphragm.

6. A device as claimed in claim 5 further characterized in that the support means for said treated paper filter of said first separating means includes a hollow cylindrical structure having closed ends of material impervious to air, water and oil, the wall of said cylindrical structure being apertured and supporting said treated paper filter, the closed top end of said cylindrical structure having a single aperture therein communicating with said first outlet, the normally closed bottom end including a safety-release structure adapted to be opened when the pressure differential thereacross exceeds a fail-safe value.

7. A device as claimed in claim 6 further characterized in that said safety-release structure is a blowout disc adapted to be ruptured when the pressure differential thereacross exceeds a fail-safe value.

8. A device as claimed in claim 7 further characterized in that said chamber formed in said casing below said diaphragm is provided with a discharge valve having a restrictive orifice for discharging said liquid-phase fluids.

9. A device as claimed in claim 8 further characterized in that said liquid-phase discharge valve includes a valve closure element spring-biased toward valve-open position but normally abutting against and held in closed position by said diaphragm, said closure element moving to open position when the pressure on the underside of said diaphragm resulting from the accumulation of liquid-phase fluids in said chamber below said diaphragm is sufficient to raise said diaphragm.

10. A device as claimed in claim 8 further characterized in that the inside wall of said casing is provided with a compressible liner for protecting said device against stress caused by freezing of water contained within said casing.

11. A device as claimed in claim 19 further characterized in that heater means are provided for heating said lower casing for preventing freezing of water contained within said casing.

12. A device as claimed in claim 11 further characterized in that said heater means is an electrical resistance heater which embraces said casing.

13. A device as claimed in claim 1 characterized in that said first separating means includes a hollow cylindrical structure having closed ends of material impervious to said gaseous-phase fluid and to said liquid-phase fluids, the one closed end having an aperture therein communicating with said first outlet, the normally closed other end including a safety-release structure adapted to be opened when the pressure differential thereacross extends a fail-safe value.

14. A device as claimed in claim 13 further characterized in that said safety-release structure is a blowout disc adapted to be blown out when the pressure differential thereacross exceeds a fail-safe value.

15. A device as claimed in claim 14 further characterized in that a diaphragm is disposed across the lower portion of said casing, and in that said second and third separating means are each mounted on said diaphragm.

16. A device as claimed in claim 15 further characterized in that said diaphragm is impervious to said liquid-phase fluids, forming a chamber therebelow, and in that a passageway is provided through said diaphragm for said liquid-phase fluids.

17. A device as claimed in claim 16 further characterized in that said chamber is provided with a discharge valve having a restrictive orifice for discharging said liquid-phase fluids.

References Cited

UNITED STATES PATENTS

| | | | |
|---|---|---|---|
| 1,797,409 | 3/1931 | Farmer | 55—309 |
| 1,935,813 | 11/1933 | Neveu | 55—309 |
| 2,036,106 | 3/1936 | Stuard | 55—421 X |
| 2,096,851 | 10/1937 | Fricke | 55—323 X |
| 2,393,119 | 1/1946 | Paasche | 55—525 X |
| 2,404,872 | 7/1946 | Walker | 55—45 X |
| 2,636,571 | 4/1953 | Churchman | 55—517 X |
| 2,840,183 | 6/1958 | George | 55—518 X |
| 2,864,505 | 12/1958 | Kasten. | |
| 2,953,249 | 9/1960 | Topol et al. | |
| 3,144,407 | 8/1964 | Olmos. | |
| 3,187,895 | 6/1965 | Pall et al. | |
| 3,201,924 | 8/1965 | Fulford et al. | 55—524 X |
| 3,229,817 | 1/1966 | Pall. | |
| 3,252,270 | 5/1966 | Pall et al. | 55—74 |
| 3,283,477 | 11/1966 | Kasten | 55—185 X |

FOREIGN PATENTS 141,958  7/1951  Australia.

HARRY B. THORNTON, *Primary Examiner.*

S. W. SOKOLOFF, *Assistant Examiner.*